United States Patent [19]

Croix-Marie et al.

[11] 3,835,952

[45] Sept. 17, 1974

[54] ATTITUDE COMPENSATION METHOD AND SYSTEM FOR GROUND-EFFECT MACHINES

[75] Inventors: Francis Marie Jean Croix-Marie, Chatillon; Daniel Jean-Marie Dubois, Gif-sur-Yvette, both of France

[73] Assignee: Bertin & Cie, Plaisir, France

[22] Filed: Jan. 26, 1973

[21] Appl. No.: 326,787

[52] U.S. Cl. .............. 180/118, 104/23 FS, 180/124
[51] Int. Cl. ............................................. B60v 1/00
[58] Field of Search ......... 104/23 FS; 180/116, 117, 180/118, 120, 121, 124

[56] References Cited
UNITED STATES PATENTS

| | | | |
|---|---|---|---|
| 3,245,487 | 4/1966 | Mackie | 180/124 |
| 3,340,943 | 9/1967 | Hirsch | 180/118 |
| 3,347,330 | 10/1967 | Heathe | 180/118 |

*Primary Examiner*—Robert J. Spar
*Assistant Examiner*—Ross Weaver
*Attorney, Agent, or Firm*—A. W. Breiner

[57] ABSTRACT

A ground-effect machine is designed for travelling along a bearing surface through the medium of a lift cushion system provided with a suspension system which includes a deformable pneumatic chamber interposed between the machine frame and the cushion proper. This cushion and this chamber have an associated fluid circuit which may comprise a passage intercommunicating them and which is so designed that the cushion pressure or lift pressure is, depending on the type of ground-effect machine, either greater or smaller than ambient pressure but in any event closer thereto than the pneumatic chamber pressure or suspension pressure.

This attitude of this ground-effect machine is compensated through regulation of these lift and suspension pressures in order to maintain their ratio at a predetermined value, by detecting any deviation of their actual ratio from said predetermined value, and by restoring it thereto with a relatively long response time through variation - modulated as a function of the detected deviation - of a pressure loss provided at a convenient location of the above-mentioned fluid circuit, preferably at the intercommunicating passage.

11 Claims, 8 Drawing Figures

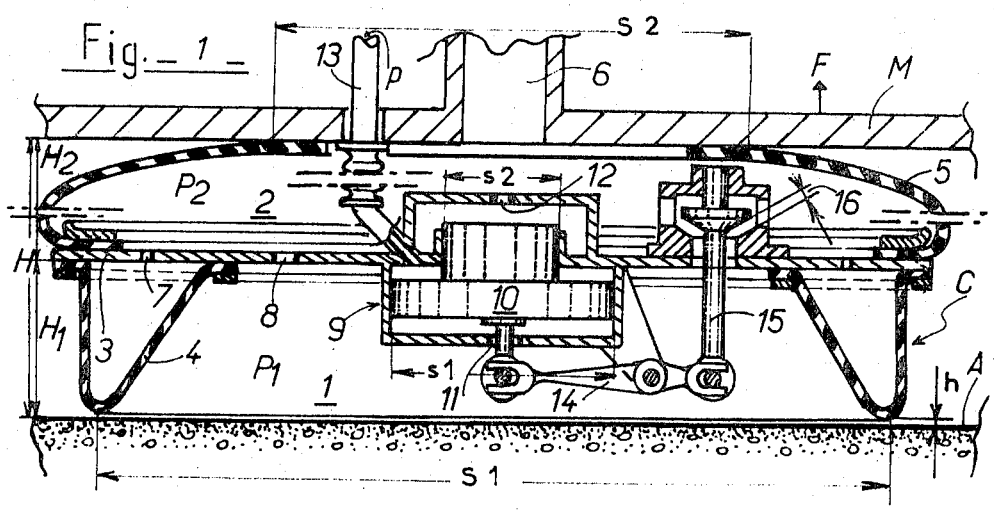
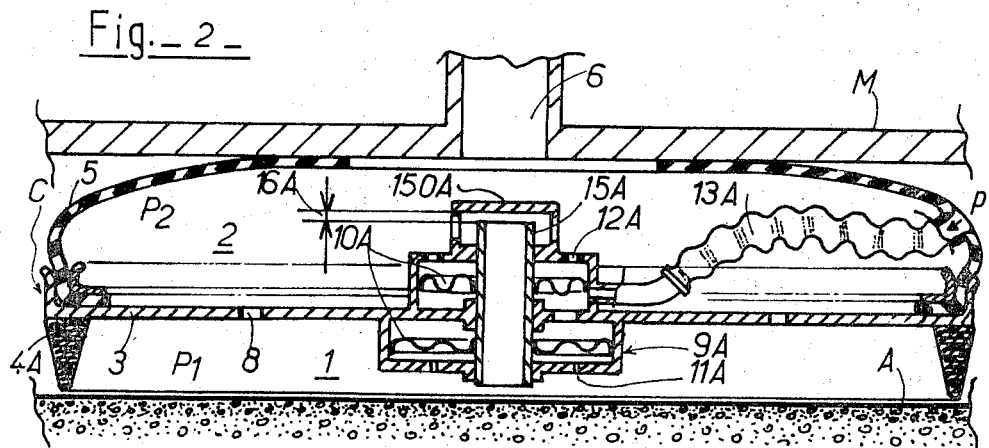
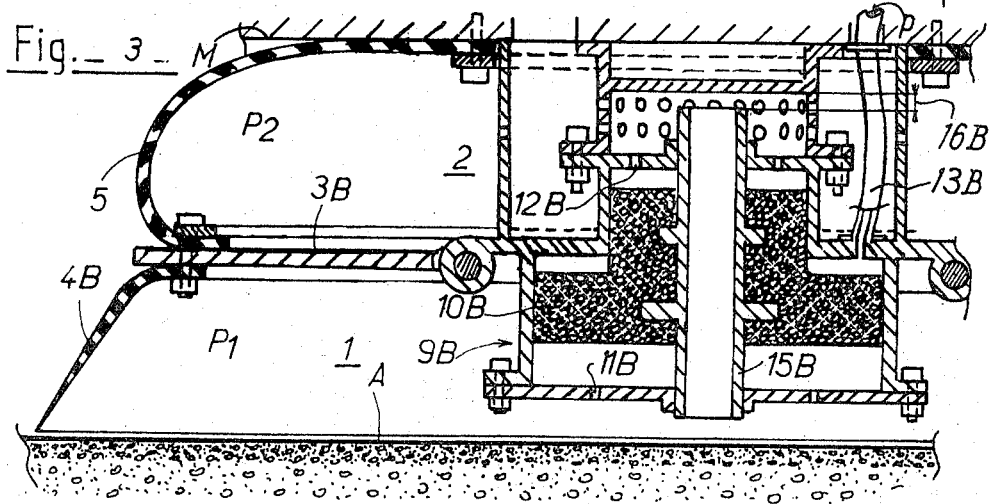

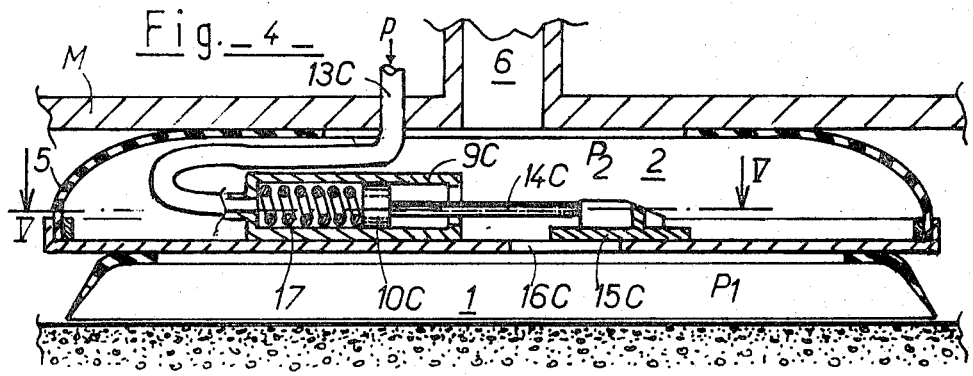
Fig._4_
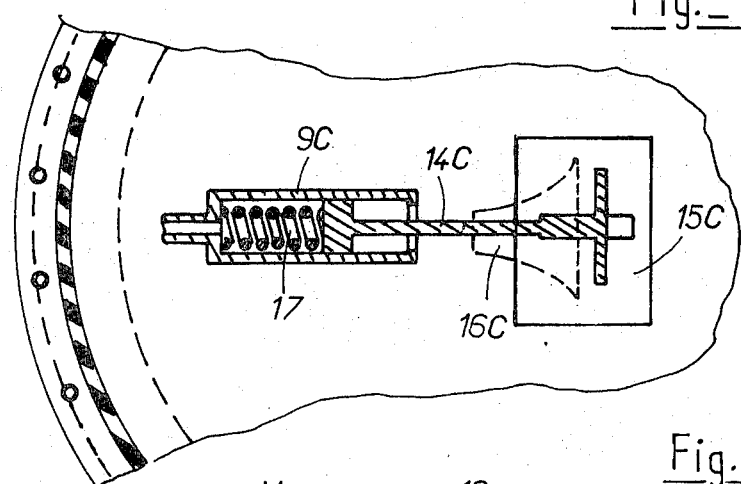
Fig._5_
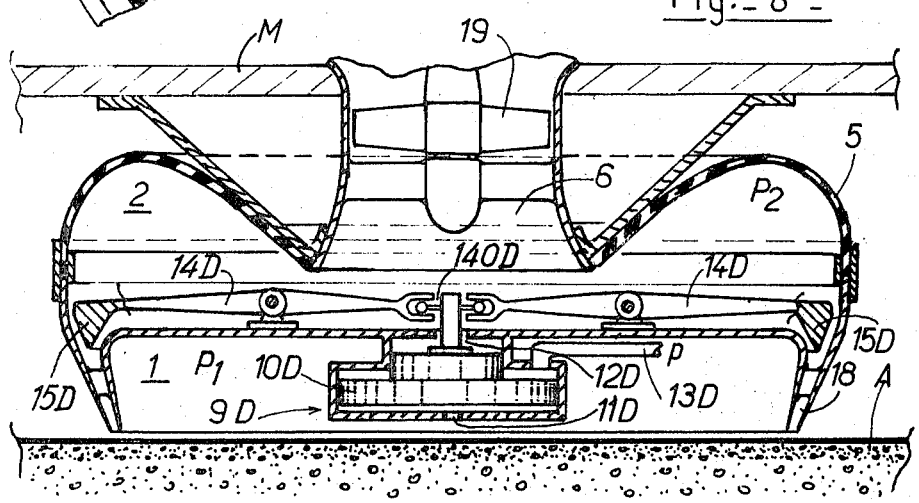
Fig._6_

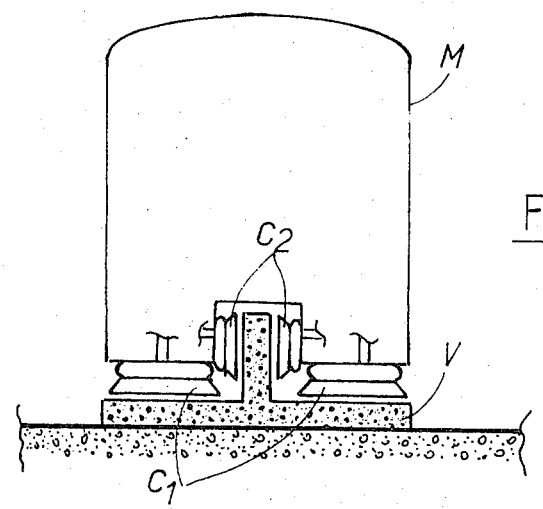
Fig._8_
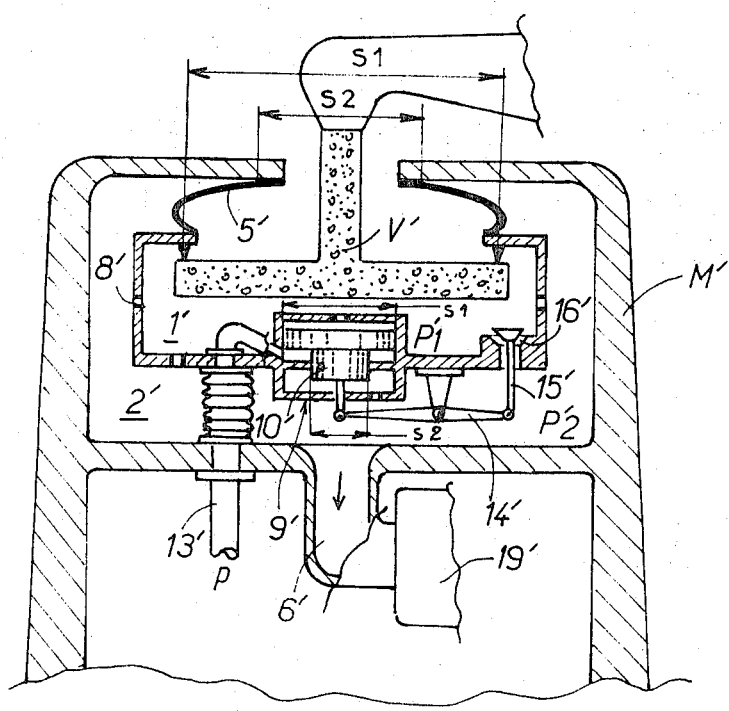
Fig._7_

ATTITUDE COMPENSATION METHOD AND SYSTEM FOR GROUND-EFFECT MACHINES

It is already known to the specialist in the art to provide pneumatic suspension means for the cushions of ground-effect machines, consisting of pneumatic chambers interposed between the cushions and structural frame of such machines whereby to absorb the shocks of various kinds usually caused by variations in pressure. In this connection it is necessary to distinguish between the lifting pressure or cushion pressure exerted against the ground or the surface supporting the ground-effect machine and the suspension pressure or pressure of the interposed pneumatic chamber exerted against the structural frame. The first-mentioned pressure is exerted over a certain supporting area on the ground (designated S1 in FIG. 1 of the accompanying drawings) and the second-mentioned pressure is exerted over a certain thrust area on the machine frame (designated S2 in FIG. 1).

As in the case of an ordinary automobile, the suspension system of a ground-effect machine can be characterized by its stiffness, which may be expressed by the ratio $\Delta F/\Delta H$ of variations in the loading forces (symbolized by arrow F in FIG. 1), exerted on the machine frame perpendicularly to the supporting surface, to the attendant variations in the clearance (designated H in FIG. 1) between the machine frame and said surface. It is furthermore possible to distinguish between two kinds of suspension stiffness: firstly, a so-called 'static' stiffness in response to prolonged loadings usually alien to the motion of the machine and possibly due to variations in the burden supported thereby, and secondly a so-called 'dynamic' stiffness in response to transient loadings usually engendered by the motion of the machine and possibly due to variations in the profile of the supporting surface. In other words, from the static point of view, only those states of equilibrium of the suspension/cushion system which are stable through time are considered.

The present invention relates to a suspension system for ground-effect machine cushions that is endowed both with infinite static stiffness, equivalent, as it were, to that which would be provided by a rigid strut member, and with finite dynamic stiffness equivalent, as it were, to that which would be provided by a flexible spring, such suspension system performing the function of an attitude compensator for the ground-effect machine.

In accordance with this invention, this is achieved by a method which consists in operating on the relative suspension and lifting pressures defined precedingly, in such manner as to maintain a predetermined ratio between these two pressures by detecting any deviation therefrom and reverting thereto with a fairly long response time by causing a variation (which may be modulated or determined according to the detected deviation) in a pressure loss which is caused to occur at a suitable location in the fluid circuit associated to the pneumatic chamber and the fluid cushion.

Obviously, although said method is clearly applicable to the customary type of ground-effect machines having cushions at positive or overpressure relatively to the surrounding atmosphere, it is equally applicable to the converse case of ground-effect machines with cushions at negative pressure relatively to the surrounding atmosphere, as described more particularly in U.S. Pat. No. 3,580,181. In the former more usual situation, the pressurized cushion is sustained with fluid from the pneumatic chamber in which prevails a pressure greater than that of the cushion, the modulated pressure loss being produced by constricting to a greater or lesser extent one or more orifices for discharging fluid from said chamber; in the second-mentioned case, on the contrary, because the cushion at negative pressure relatively to the atmosphere is nevertheless at a higher pressure than the pneumatic chamber, the modulated pressure loss must occur upon a communication passageway through which the fluid flows from the cushion to the chamber.

The subject method of this invention is carried into practice by means of a system to which this invention likewise relates and which consists mainly of a movable throttling member which modulates the pressure loss and which is controlled by a pressure detector preferably subjected in addition to a reference pressure which may be the ambient pressure but which may be different therefrom, in which case it is preferably adjustable.

In one possible embodiment of the system according to this invention, the detector comprises a movable compound having two opposed active faces against which the lifting pressure and the suspension pressure are exerted, respectively, the areas of these two faces being substantially in the same ratio as the thrust areas of the cushion against the ground and of the pneumatic chamber against the machine frame, respectively. The differential area of the two faces is subjected to the reference pressure which may be atmospheric pressure (or possibly a controllable pressure to permit attitude settings different from the original attitude).

In accordance with an alternative embodiment, the movable throttling member is configured in order to obey a predetermined law of variation of the pressure loss as a function of movement of said member, the latter being responsive either to the lifting of the suspension pressure but preferably to the latter pressure.

The movable throttling member is operatively connected to the movable compound of the pressure detector either through linkage means or preferably by direct incorporation in said compound, whereby the throttling member and the pressure detector form an integral unit.

The description which follows with reference to the accompanying non-limitative exemplary drawings will give a clear understanding of how the invention can be carried into practice.

IN THE DRAWINGS

FIGS. 1, 2 and 3 are sectional views through planes normal to the supporting surface, showing ground-effect cushion suspension systems according to the invention embodying three alternative embodiments of a pressure detector with dual active faces;

FIG. 4 is a corresponding view showing such a system with a throttling member configured to produce a determinate law of pressure loss variation;

FIG. 5 is a schematic cross-sectional view through the line V—V of FIG. 4;

FIG. 6 is a sectional view corresponding to those in FIGS. 1 through 4 and illustrating application of the invention to a cushion arrangement with a confining fluid curtain;

FIG. 7 is a corresponding view illustrating application of the invention to a system utilizing negative-pressure cushions; and FIG. 8 is a highly diagrammatic portrayal of an application of the invention to a vehicle guided along a track.

The latter is a track V of inverted-T-shaped cross-section having horizontal and vertical surfaces which provide thrust surfaces for supporting cushions C1 and guiding cushions C2 of the ground-effect machine M, and these cushions are fixed to the structural frame of machine M opposite the corresponding faces of track V.

The cushion arrangements shown diagrammatically in FIG. 8 will be described in greater detail hereinafter, but for simplification purposes reference will be had only to a supporting cushion system C1, it being understood that the possible guiding cushion system C2 is identical thereto. The term 'lift' is therefore to be taken in a general sense as applying equally to a lifting system exerting an upwardly-directed vertical force on the machine and to a guiding system exerting equal and opposite horizontal forces thereon.

The cushion system C of FIG. 1 is of the kind described in U.S. Pat. No. 3,647,018. It is briefly recalled herein that this cushion system is subdivided, into two separate spaces 1 and 2 in which prevail relative pressures P1 and P2 respectively, by an intermediate perforated plate 3 movably disposed between supporting surface A, from which it is spaced by a distance H1, and the structural frame of machine M, from which it is spaced by a distance H2. The first space 1 forms the cushion proper which is laterally confined by an inflatable folded lip 4 forming a flexible wall peripherally secured to movable intermediate plate 3 and bounding on supporting surface A a lift area S1 wetted by the fluid at pressure P1 of cushion 1, the leakage gap between lip 4 and supporting surface A being designated $h$. The second space 2 forms a pneumatic suspension chamber which is laterally confined by a flexible wall 5 likewise peripherally secured to movable intermediate plate 3 and bearing, responsively to pressure P2, against the frame of machine M over a so-called suspension area designated S2.

The pressure-fluid supplied by a fan or other suitable source (not shown) on board the machine M reaches chamber 2 through a passage 6, whence said fluid inflates folded lip 4 through holes 7 formed in movable intermediate plate 3 and also supplies cushion 1 through further holes 8 therein, and thereafter escapes through leakage gap $h$. The flow of fluid through holes 8 takes place with a certain pressure loss, whereby under normal steady operating conditions the pressure P2 in pneumatic suspension chamber 2 is higher than the pressure P1 in lift cushion 1. In the steady states, $P1.S1 = P2.S2$, or $P1/P2 = S2/S1$.

Now the areas S1 and S2 depend on the geometry of flexible walls 4 and 5 respectively, which is in turn dependent on the values H1 and H2 respectively. It is to be noted, in this connection that lift area S1 can be regarded as near-constant since in most instances its variations are negligible by comparison with the variations in suspension area S2. Hence the value H1 can also be regarded as near-constant.

In the so-called 'dynamic' mode, suspension movement will occur primarily in flexible wall 5, with variations in H2, the ideal being for intermediate plate 3 only to sustain shifts due to 'shocks' caused, for instance, by changes in the profile of supporting surface A, without the structure M being affected thereby.

As stated precedingly, in the so-called 'static' mode it is required that the system possess infinite stiffness, i.e., that $H$ be constant irrespective, say, of the load. Since S1 and hence H1 are more or less invariable, then for $H = H1 + H2$ to be constant it is necessary that H2 likewise be almost invariable, which in turn calls for near-constancy of S2.

As previously indicated, $P1/P2 = S2/S1$. the near-constancy of S1 and S2 implies near-constancy of the ratio $P1/P2$, so that in order to satisfy the requirement for infinite 'static' stiffness it is necessary that $P1/P2 = k$.

In accordance with the present invention, this ratio is detected by a manometric device 9 comprising a stepped piston having two opposite faces of different area, to wit a large face of useful area $s1$ subjected to the lifting pressure P1 through a calibrated orifice 11, and a small face of useful area $s2$ subjected to the suspension pressure P2 through a calibrated orifice 12, the ratio $s2/s1$ being equal to the predetermined constant $k$ given by the ratio $P1/P2$. The calibrated orifices 11 and 12 are calculated so that the respective pressures P1 and P2 are transmitted to the faces of area $s1$ and $s2$ of piston 10 with a somewhat long response time. The intermediate differential face of piston 10 of useful area $s1-s2$ is subjected to a reference pressure $p$, which may be the atmospheric pressure, through a conduit 13.

Piston 10 is operatively connected through linkage 14 to a movable member 15 which varies the passageway 16 providing communication between chamber 2 and cushion 1, and hence the pressure loss therethrough.

It will be comprehended that, in the steady state, $P1.s1 = P2.s2$, hence $P1/P2 = s2/s1 = k$. If the value of the ratio $P1/P2$ deviates from that of constant $k$, the device 9 detects the difference after a certain time-lapse dependent on the calibration of orifices 11 and 12, after which piston 10 shifts and moves the member 15 whereby to so vary the pressure loss gap 16 as to cause the ratio $P1/P2$ to be restored to its prescribed value $k$. In other words, the compound 9 through 16 operates as a regulator of the ratio between pressures P1 and P2, with the ratio between areas $s1$ and $s2$ determining the ratio between these pressures. For example, should the load supported by the cushion increase, the leakage interval $h$ decreases and thereby increases the pressures P1 and P2, whereas the pressure losses through perforated intermediate plate 3, hence the difference $P2 - P1$, decrease. After a certain lag due to calibrated orifices 11 and 12, the piston 10 subjected to the new values of pressures P1 and P2 tends to rise anew, causing the passageway section 16 to be reduced by member 15. The pressure losses through intermediate plate 3 consequently increase until the piston is in a state of equilibrium once more, i.e., until the ratio $P1/P2$ has reverted to its prescribed value $k$.

In the reasoning set forth precedingly, the tension of the material used for flexible wall 5 has been disregarded, but even taking it into account in considering the different states of equilibrium will not affect the conclusions drawn hereinbefore.

The alternative embodiment shown in FIG. 2 differs from the embodiment just described in a number of component parts, like parts to those described with reference to the previous embodiment being designated by like reference numerals followed by the suffix letter A. A case in point is the lip 4A for confining the cushion 1, which lip is in this instance a seal of great rigidity whereby the lift area S1 because rigorously constant.

In this alternative embodiment, the pressure detector 9A comprises two deformable membranes 10A the useful areas of which are invariably in the required ratio $s2/s1 = k$ and are always subjected to the pressures $P1$ and $P2$ through calibrated orifices 11A and 12A, while the internal space between the two membranes is kept at the reference pressure $p$ (e.g. atmospheric pressure) through conduit 13A. The pressure loss-adjusting movable member 15A is in this instance a tubular part 15A incorporated within detector 9A and suspended from membranes 10A. The pressure loss is dependent on the variable gap 16A between one end of tubular part 15A and a plate 150A fast with detector 9A.

The theory of operation of this alternative embodiment is similar to that of the previously described embodiment and consequently requires no further description.

The same applies to the possible embodiment shown in FIG. 3, in which like parts are designated by like reference numerals followed by the suffix letter B. Detector 9B includes a deformable block of foam material 10B with closed cells, through which is inserted the tubular part 15B for adjusting the pressure loss gap 16B.

It is to be noted that in FIG. 3 the detector 9B is shown mounted on a fixed element fast with structural frame M and that the cushion 1 is supplied solely through the pressure loss gap 16B.

Cushion 1 is confined laterally by a plurality of flexible walls 4B, each of which is supported by a hinged plate 3B in the manner described in French Pat. No. 1,602,658.

In the forms of embodiment heretofore described, detection is effected by a movable or deformable system having two active faces sensitive to the pressures $P1$ and $P2$. Clearly, however, it would be possible to dispense with detecting one of said pressures, for instance the pressure $P1$, by counterbalancing the detected pressure (for instance the pressure $P2$) by means of an elastic restoring force such as provided by a spring 17 (see FIGS. 4 and 5) and by so mutually configuring the communication passage 16C and the movable throttling member 15C connected to piston 10C of detector 9C by rod 14C as to cause variations in the pressure loss through 16C as a function of movement of 15C to obey a predetermined law.

The face of piston 10C not subjected to the pressure $P2$ sustains the pressure $p$, which may be atmospheric pressure for example.

In the event of provision of a cushion confined by a peripheral jet or fluid curtain, of the kind described in U.S. Pat. No. 3,140,753, regulation in accordance with the present invention is effected by means of a plurality of separate but juxtaposed elements 15D (see FIG. 6) which form a movable crown that throttles to a greater or lesser extent the delivery of pressure fluid to peripheral nozzle 18 from the pneumatic chamber 2 supplied by fan 19. Each element 15D is associated to a beam-lever 14D which is actuated by transmission means 140D operated by the stepped piston 10D of detector 9D sensitive to the pressures $P1$ and $P2$ of cushion 1 and chamber 2, respectively, via calibrated orifices 11D and 12D.

The present invention applies likewise to ground-effect machines supported by a negative pressure or suction effect, as described in U.S. Pat. No. 3,580,181 and illustrated herein in FIG. 7, in which a machine M' travels beneath a track V' with an interposed supporting cushion 1' at negative pressure $P'1$. This cushion communicates with a chamber 2', in which prevails a more accentuated negative pressure $P'2$, through holes 8' and also through the agency of a variable pressure loss 16' adjusted by a movable member 15' actuated through transmission means 14' by the stepped piston 10' of detector 9'. The lift-imparting negative pressure is generated by a suction device 19' communicating with chamber 2' through conduit 6'.

The magnitudes $S1$, $S2$, $s1$ and $s2$ similar to those in FIG. 1 are shown in FIG. 7.

It goes without saying that FIG. 8 illustrates application of the invention to a track-guided ground-effect vehicle for exemplary purposes only, and that the invention is likewise applicable to other types of ground-effect machines and more particularly to those usable for mechanical handling purposes and to water-borne craft.

We claim:

1. For a ground-effect machine movable along a bearing surface through the medium of a lift-cushion system suspended by a deformable pneumatic chamber interposed between a frame portion of said machine and a lift cushion, said cushion and said chamber having their respective lift pressure and suspension pressure inter-related by a pressure drop such that said suspension pressure is substantially different from ambient pressure and that said lift pressure is intermediate said suspension pressure and said ambient pressure, an attitude compensating method comprising the steps of:

detecting any deviation from a predetermined value, of the ratio of said lift pressure and suspension pressure, and modulating said pressure drop as a function of said detected deviation, to restore said ratio after a substantial response time to said predetermined value, whereby said lift pressure and suspension pressure are regulated to the effect of maintaining their ratio at said predetermined value.

2. Method as claimed in claim 1, wherein said pressure ratio deviation is detected by sensing said lift pressure, sensing said suspension pressure, computing the ratio of said sensed pressures, and comparing said computed ratio with said predetermined value for rating said deviation, and wherein said pressure drop is modulated by variably throttling a passage interconnecting said lift cushion and said pneumatic chamber.

3. Method as claimed in claim 1, comprising the further step of subjecting the pressure ratio detection to a calibration parameter in the form of a reference pressure.

4. In a ground-effect machine which is designed for travelling along a bearing surface with the interposition, between said surface and a frame portion of said machine, of a cushion space adjacent said surface and a deformable pneumatic chamber adjacent said frame portion, and which has a fluid circuit interrelating said cushion space and said pneumatic chamber to build up in said pneumatic chamber a suspension pressure substantially different from ambient pressure and in said cushion space a lift pressure intermediate said suspension pressure and ambient pressure, an attitude compensating device comprising:
controllable means for producing a variable pressure drop in said fluid circuit,
means responsive to the ratio of said lift pressure and suspension pressure, for detecting any deviation of said ratio from a predetermined value, and
transmission means for bringing said variable pressure drop producing means under the control of said pressure ratio deviation detecting means, to restore said ratio after a substantial response time to said predetermined value.

5. Device as claimed in claim 4, wherein said variable pressure drop producing means comprises a passage throttling valve in said fluid circuit.

6. Device as claimed in claim 5, wherein said pressure ratio deviation detecting means comprises a movable compound having two opposed operative faces of different effective areas respectively exposed to said lift pressure and said suspension pressure and in a ratio substantially reciprocal to said predetermined value.

7. Device as claimed in claim 6, further comprising means for exerting a reference pressure on the differential area of said operative faces.

8. Device as claimed in claim 6, wherein said passage throttling valve is incorporated in said movable compound and forms therewith a unitary structure.

9. Device as claimed in claim 5, wherein said passage throttling valve comprises associated relatively movable parts which are mutually designed in accordance with an outline defining a predetermined law of variation of said pressure drop as a function of the relative displacement of said associated parts, and wherein said pressure ratio deviation detecting means comprises means for sensing either one of said lift pressure and suspension pressure, and an antagonistic spring.

10. Device as claimed in claim 9, wherein said pressure ratio deviation detecting means further comprises means for exerting a reference pressure in conjunction with said spring and in antagonism with said pressure sensing means.

11. Device as claimed in claim 5, wherein said transmission means comprises a linkage extending between said pressure ratio deviation detecting means and said passage throttling valve.

* * * * *

UNITED STATES PATENT AND TRADEMARK OFFICE
CERTIFICATE OF CORRECTION

PATENT NO. : 3,835,952

DATED : September 17, 1974

INVENTOR(S) : Francis Marie Jean CROIX-MARIE ET AL

It is certified that error appears in the above-identified patent and that said Letters Patent are hereby corrected as shown below:

Title page, in the heading, [75] Inventors:, "Francis Marie Jean Croix-Marie, Chatillon" should read -- Francis Marie Jean Croix-Marie, Viry Chatillon --;

Title page, in the heading, the priority claim should read as follows: -- Priority is claimed of French Application No. 72.02376 filed January 25, 1972 --;

Column 2, line 40, "of" should read -- or --;

Column 3, line 60, insert a comma (,) after "connection";

Column 5, line 6, "because" should read -- becomes --.

Signed and Sealed this

Third Day of August 1976

[SEAL]

Attest:

RUTH C. MASON
*Attesting Officer*

C. MARSHALL DANN
*Commissioner of Patents and Trademarks*